3,506,660
PRODUCTION OF TRIS-(N-β-HYDROXYALKYL)-ISOCYANURIC ACIDS
Kurt Schneider, Limburgerhof (Pfalz), and Harry Distler, Ludwigshafen (Rhine), Germany, assignors to Badische Anilin- & Soda-Fabrik Aktiengesellschaft, Ludwigshafen (Rhine), Germany
No Drawing. Filed Apr. 23, 1968, Ser. No. 723,569
Claims priority, application Germany, Apr. 25, 1967, 1,670,214
Int. Cl. C07d 55/38
U.S. Cl. 260—248                              9 Claims

ABSTRACT OF THE DISCLOSURE

An improved process for the production of tris-(N-β-hydroxyalkyl)-isocyanuric acids by the reaction of cyanuric acid with alkylene oxides at elevated temperature in the presence of solvents, the improvement consisting in using as the solvent a lower alcohol and/or a water-soluble ether. Tris-(N-β-hydroxyalkyl)-isocyanuric acids are suitable as crosslinking agents for example for polymers containing carboxyl groups.

---

This invention relates to an improved process for the production of tris-(N-β-hydroxyalkyl-isocyanuric acids by reaction of cyanuric acid with alkylene oxides.

It is known from U.S. patent specification No. 3,088,948 that tris-(N-β-hydroxyalkyl)-isocyanuric acids are obtained by reaction of cyanuric acid with alkylene oxides at temperatures of 25° to 140° C. in the presence of inert solvents and alkalies as catalysts. The solvents described are dialkylformamides, N-alkylmorpholines and N-alkyloxazolidinones-(2). The process has the disadvantage that both the high-boiling solvent and the catalyst have to be removed from the reaction mixture which, involves considerable expenditure for equipment. Furthermore when alkalies are used as catalysts, a secondary reaction takes place in which oxazolidinones are formed and which decreases the yield considerably. It is also known from U.S. patent specification No. 3,265,694 that tris-(N-β-hydroxyalkyl)-isocyanuric acids are obtained by reaction of cyanuric acid with alkylene oxides in the presence of acids. In order to obtain good yields it is necessary however to use large amounts of solvent such as dimethylformamide. According to another method described in U.S.S.R. patent specification No. 118,042 tris-(N-β-hydroxyethyl)-isocyanuric acid is obtained by reaction of cyanuric acid with ethylene oxide in benzene and in the presence of dimethylaniline as catalyst. Moreover it is known from J. Org. Chem., 28, 85 (1963) that cyanuric acid may be reacted with ethylene oxide in dimethylformamide as solvent without adding catalysts to form tris-(N-β-hydroxyethyl)-isocyanuric acid. The last mentioned process also has the disadvantage that the recovery of tris-(N-β-hydroxyethyl)-isocyanuric acid from the reaction solution in pure form is very expensive.

It is an object of the invention to provide an improved process by which tris-(N-β-hydroxyalkyl)-isocyanuric acids are obtained that may be used without further purification. It is also an object of the invention to provide an improved process according to which it is neither necessary to distill off a large amount of solvent nor to remove catalyst.

In accordance with this invention the said and other objects and advantages are achieved in an improved process for the production of tris-(N-β-hydroxyalkyl)-isocyanuric acids by reaction of cyanuric acid with alkylene oxides at elevated temperature in the presence of solvents by using as solvents lower alcohols and/or water-soluble ethers.

Preferred alkylene oxides have from one to four carbon atoms and one epoxide group in the molecule. Examples of suitable alkylene oxides are ethylene oxide, propylene oxide, isobutylene oxide and butylene-(1) oxide. Ethylene oxide and propylene oxide are especially preferred because of their easy industrial accessibility.

It is advantageous to use about 3 moles of alkylene oxide to each mole of cyanuric acid; it is preferred to use the alkylene oxide in a slight excess, for example of up to 10 mole percent.

The reaction proceeds in general at temperatures of from 60° to 160° C. Good results are obtained at temperatures of 70° to 140° C.; the reaction proceeds particularly well at temperatures of 100° to 130° C. The reaction may be carried out at atmospheric pressure. It is also possible, however, to use superatmospheric pressure, for example up to 50 atmospheres, if alkylene oxides which are gaseous at the temperatures used are to be used in the liquid phase.

The reaction is carried out in the presence of a lower alcohol and/or a water-soluble ether as solvent. Preferred lower alcohols have one to five carbon atoms. They may be unsaturated and may also have a branched carbon chain. Preferred water-soluble ethers have four to six carbon atoms and one or two oxygen atoms in the molecule. The carbon atoms may also form together with the oxygen atoms a five-membered or six-membered heterocyclic ring. Examples of suitable ethers are tetrahydrofuran, dioxane and glycol monomethyl ether. Alkanols having two to four carbon atoms, especially isopropanol, are particularly preferred.

The solvent is in general used in an amount of 10 to 1000% by weight, particularly 100 to 500% by weight, with reference to cyanuric acid. The solvents used have good solubility for the reaction products at the reaction temperatures and considerably decreased solubility therefor at room temperature. The most favorable amount of solvent may be determined by simple experiment.

The process according to the invention may be carried out for example by placing in a vessel the cyanuric acid and the said solvent in a suitable ratio and metering in the alkylene oxide in the said ratio at the said temperature. The reaction is in general over after eight to fifteen hours. The reaction solution is cooled and the deposited tris-(N-β-hydroxyalkyl)-isocyanuric acid is isolated by conventional method, for example by filtration. The mother liquor obtained may be used again as a solvent for the reaction without purification.

The tris-(N-β-hydroxyalkyl)-isocyanuric acids prepared by the process according to this invention are suitable as crosslinking agents, for example for high polymers containing carboxyl groups.

The invention is further illustrated by the following examples in which the parts specified are parts by weight.

EXAMPLE 1

1300 parts of cyanuric acid is suspended in 2700 parts of isobutanol and then 1360 parts of gaseous ethylene oxide is passed into the suspension at 120° to 133° C. in the course of ten hours. The suspended cyanuric acid passes into solution during the reaction. When the reaction is over the reaction solution is allowed to cool so that a precipitate is formed. The precipitate is isolated by filtration. 2317 parts of tris-(N-β-hydroxyethyl)-isocyanuric acid having a melting point of 130° to 132° C. is obtained. The yield is 88.8% of the theory.

*Analysis.*—Calculated (percent): N, 16.1. Found (percent): N, 16.1.

EXAMPLE 2

The procedure of Example 1 is followed, 1300 parts of cyanuric acid (suspended in 4000 parts of isopropanol) being reacted with 1400 parts of ethylene oxide at 105° to 115° C. for twenty-two hours. 2163 parts (82.8% of the theory) of tris-(N-β-hydroxyethyl)-isocyanuric acid having a melting point of 130° to 133° C. is obtained.

*Analysis.*—Calculated (percent): N, 16.1. Found (percent): N, 16.2.

EXAMPLE 3

The procedure of Example 1 is followed, 1300 parts of cyanuric acid (suspended in 3250 parts of dioxane) being reacted with 1365 parts of ethylene oxide at 100° to 110° C. for twenty-two hours. 1926 parts (73.8% of the theory) of tris-(N-β-hydroxyethyl)-isocyanuric acid having a melting point of 130° to 132° C. is obtained.

*Analysis.*—Calculated (percent): N, 16.1. Found (percent): N, 16.2.

We claim:

1. An improved process for the production of tris-(N-β-hydroxyalkyl)-isocyanuric acids by reaction of cyanuric acid with alkylene oxides having two to four carbon atoms in about the molar ratio 1:3 at temperatures of from 60° to 160° C. in the presence of a solvent wherein the improvement consists in using as the solvent an alcohol having one to five carbon atoms or a water-soluble ether having four to six carbon atoms and one or two oxygen atoms in the molecule.

2. A process as claimed in claim 1 wherein ethylene oxide is used as the alkylene oxide.

3. A process as claimed in claim 1 wherein propylene oxide is used as the alkylene oxide.

4. A process as claimed in claim 1 carried out at a temperature of from 70° to 140° C.

5. A process as claimed in claim 1 carried out at a temperature of from 100° to 130° C.

6. A process as claimed in claim 1 carried out at atmospheric pressure.

7. A process as claimed in claim 1 carried out at a pressure of up to 50 atmospheres.

8. A process as claimed in claim 1 wherein an alkanol having two to four carbon atoms is used as the solvent.

9. A process as claimed in claim 1 wherein the amount of solvent used is 10 to 1000% by weight with reference to the amount of cyanuric acid.

References Cited

UNITED STATES PATENTS

| 3,088,948 | 5/1963 | Little et al. | 260—248 |
| 3,265,694 | 8/1966 | Walles et al. | 260—248 |
| 3,410,854 | 11/1968 | MacGregor et al. | 260—248 |

HENRY R. JILES, Primary Examiner

J. M. FORD, Assistant Examiner

U.S. Cl. X.R.

424—251